Aug. 22, 1967     D. FRAZIER     3,337,369
NON-POROUS DIFFUSION MEMBRANE FUEL CELL
Filed Sept. 29, 1960
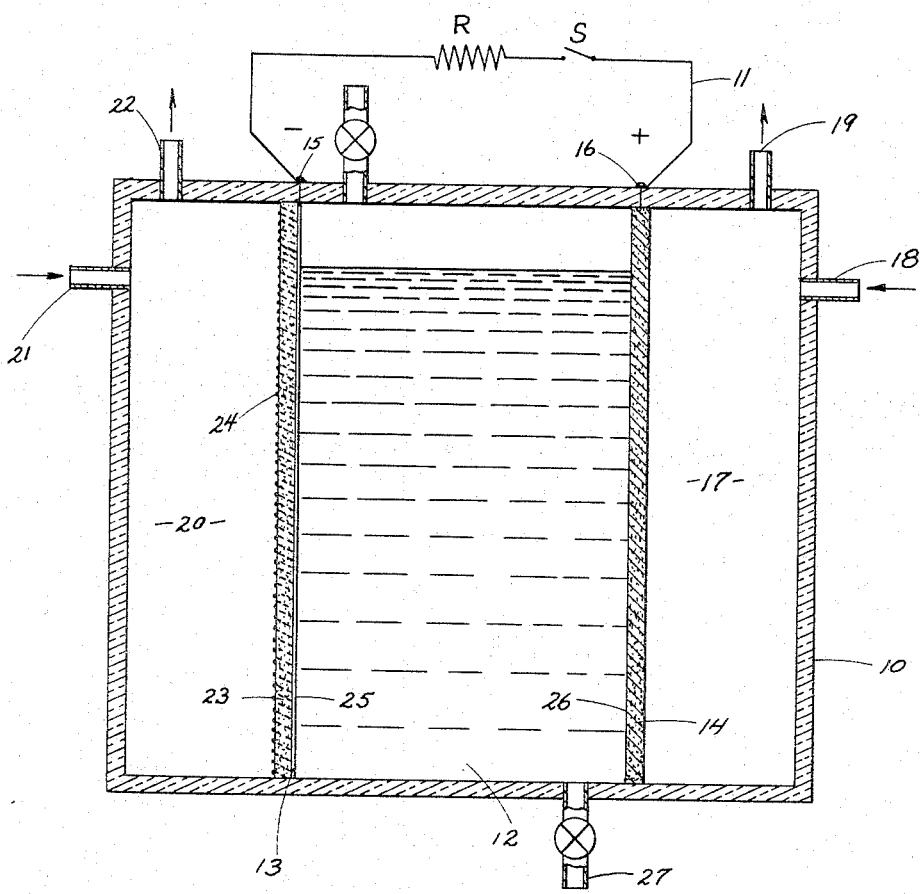
INVENTOR.
David Frazier
BY
Schramm, Kramer & Sturges
ATTORNEYS.

United States Patent Office 3,337,369
Patented Aug. 22, 1967

3,337,369
NON-POROUS DIFFUSION MEMBRANE FUEL CELL
David Frazier, Hudson, Ohio, assignor, by mesne assignments, to Leesona Corporation, Warwick, R.I., a corporation of Massachusetts
Filed Sept. 29, 1960, Ser. No. 61,332
5 Claims. (Cl. 136—86)

This invention relates generally to the direct conversion of one form of energy to another, and more particularly relates to an apparatus and method for accomplishing such direct conversion electrochemically. The principles of the invention, for exemplary purposes, will be described in reference to a fuel cell for directly converting chemical energy into electrical energy, it being understood, however, that these principles are applicable to other types of reaction apparatus as well.

The direct conversion of chemical energy into electrical energy is accomplished by causing chemical reactions to take place between electrochemically reactive materials at the junctures between spaced electron conductors and an intermediately disposed ion-containing and conducting medium to form a continuous energy exchange system. The reactive materials are separately supplied to each juncture so that the charge exchange of the reaction takes place ionically through the ion-conductor forming an internal circuit, and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, where hydrogen is employed as one of the materials, and oxygen as the other, the oxidation and reduction, respectively, of each of these materials at the corresponding juncture between the electronic and ionic conductors generates electrical energy in the external circuit and produces water as a by-product of the reaction. When each of the materials is continuously supplied and consumed within such an apparatus, it may be likened respectively, to a fuel and to an antifuel, the former of which is selected to yield electrons in its chemical reaction, and the latter of which is selected to accept electrons.

Normally, in any such apparatus, the fuel and antifuel are supplied in a relatively stable condition and some means is required for activating their conversion from the normally stable reactant state to their reaction product state. It is believed that such conversion of the fuel and antifuel takes place by means of chemical adsorption to a chemisorbed state and desorption to the reaction product state at the corresponding junctures between the electron and the electron and ion conductors. Such conversion of the fuel and antifuel is not practically self-motivating and is, therefore, preferably enhanced by the introduction of some means which will promote adsorption at each juncture and some ionic means in the ion-conducting medium which will promote desorption at each juncture. The reaction products may be removed from the apparatus in any convenient manner and preferably as they are formed.

For the purpose of description of an illustrative reaction apparatus, a fuel cell for accomplishing the direct conversion of chemical energy to electrical energy will be used. The electron-conductors will be identified as electrodes, and more specifically, as the anode and cathode, respectively, depending upon whether they are on the fuel or antifuel side of the cell. The fuel will be identified throughout as any hydrogen-containing substance which is oxidizable relative to the antifuel which will, in turn, be identified as any substance which is reducible relative to the fuel. Oxidation and reduction, respectively, contemplate the release and acceptance of electrons. The ion conductor will be identified throughout as any medium which is capable of conducting an electrical charge associated with an atom or a group of atoms, i.e., ions, and which, therefore, electronically isolates the electronic conductors from each other in the internal circuit. The junctures between the electrodes and the ion conductor will be identified throughout as interfaces. The activating means for promoting the conversion of the fuel and antifuel from their reactant state through the chemisorbed state to the reaction product state will be more specifically identified in conjunction with their functional coaction in the cell and as an adsorber and a desorber. The overall reaction of the cell will be referred to as an electrochemical reaction.

Briefly stated, this invention is concerned with the provision of a reaction apparatus for the interaction of a plurality of reactants, such as fuel and antifuel reactants, at least one of which includes hydrogen. The interaction which is contemplated is of a controlled nature as distinguished from a free or uncontrolled interaction. To provide an environment for such control, barrier means are provided to isolate the reactants and means are provided which selectively coact with such barrier means for transmitting hydrogen therethrough to permit interaction of the hydrogen only with a co-reactant therefor. This invention has particular utility in electro chemical reaction apparatus, and more specifically in a fuel cell for the controlled interaction of a fuel with an antifuel to produce an electric current.

In the annexed drawings:

The figure shows an embodiment of a fuel cell illustrative of one form of reaction apparatus for the interaction of a plurality of reactant materials one of which includes hydrogen.

With more particular reference to the figure, there is provided a cell body 10 of any suitable form, a rectangular form being shown in the figure, for illustrative purposes only. Any suitable non-conducting material impervious to gas and liquid, e.g. rubber or glass, may be used as a material of construction for the cell body 10. An electrochemical reaction apparatus is composed of an external electron conducting circuit and an internal ion-conducting circuit, these parts being generally indicated in the figure as external circuit 11 and internal circuit 12. The external circuit 11 is composed of a pair of spaced apart electrodes 13 and 14 suitably connected as through terminals 15 and 16, respectively, to a load R and a switch S. Electrode 14 may be of any suitable conducting material such as metal, metal particles distributed on a porous matrix, e.g. porous ceramic matrix or a porous graphite matrix, or the electrode may be solely of a porous graphitic nature. Electrode 14 is in intimate contact with an antifuel, and for illustrative purposes, this will be regarded herein as an oxygen-containing gas, such as, air. Other relatively reducible materials may, of course, be used as the antifuel, for example, a halogen, such as, bromine. The antifuel is continuously fed to a chamber 17 through a suitable inlet port 18 under such conditions as to provide within the chamber 17 a concentration of relatively reducible substance, e.g., oxygen, which is higher than the concentration of such relatively reducible substance in the pores of said electrode 14. The effect of such relatively higher concentration is to provide a driving force tending to move the relatively reducible material through the electrode for electrochemical interaction as hereinafter more particularly described. Spent antifuel material may be exhausted by any suitable means such as an exhaust port 19.

The fuel electrode 13 is adapted to be contacted by a hydrogen-containing fuel, that is a fuel which contains analyzable hydrogen in chemical combination or in physical combination. For the purpose of contacting the fuel with the fuel electrode 13, there is conveniently provided a chamber 20 having a hydrogen-containing fuel inlet 21 and the outlet 22 is adapted to maintain a concentration of hydrogen-containing fuel in excess of the concentration of hydrogen in the porous matrix of electrode 13, thereby providing a driving force for hydrogen toward the zone of electrochemical reaction.

In the specific embodiment shown in the figure, the electrode 13 is a thin continuous sheet of palladium supported upon a porous substrate 23. Deposited upon the side opposite the palladium sheet 13 is a dehydrogenation catalyst diagrammatically illustrated at 24. Any suitable dehydrogenation catalyst e.g. palladium, nickel, etc., may be used for the purpose of removing chemically combined hydrogen from a hydrogen-containing fuel, such as, ethane, Where the hydrogen occurs in the fuel only in admixture, a dehydrogenation catalyst 24 is not necessary.

The thin sheet of palladium 13 is selectively permeable to hydrogen. Thin sheets of iron, titanium and columbium are likewise selectively permeable to hydrogen. Hence, any of these metals may be used in sheet form to serve both as the means for selectively passing hydrogen into the zone of reaction and as an electron conductor for conducting electrons released in the course of the electrochemical reaction, or taken up in the course of the electrochemical reaction from and to the reaction zone, as the case may be. Palladium also has the property of being an excellent dehydrogenation catalyst, and hence this material may also serve the third purpose of providing catalytic means for analysis of a hydrogen-containing fuel wherein the hydrogen is in chemical combination.

Normally, the fuel and antifuel are highly reactive with each other, and such reaction may occur either spontaneously or under ignition. In such event, much of the energy of the reaction is lost as heat. In order to prevent interaction of the reactant materials under conditions productive of energy forms other than electrical, the reactant materials must be separated by a barrier. In the present example of a fuel cell, the barrier means includes an ion-containing and conducting medium 12 and the electrode 13. The junctures 25 and 26 between the ion-containing and conducting medium 12 and the surfaces of the electrodes 13 and 14 respectively, are referred to as electrode interfaces herein. It is at these interfaces that the controlled electrochemical reactions take place in a multi-phase reaction characteristic of a fuel cell utilizing gaseous reactant materials. In the embodiment shown in FIG. 1, the ion-containing and conducting medium is shown as an aqueous medium, containing dissolved therein an activator in ionized form such as a water-soluble acid, salt, or base which aids in the desorption of the chemisorbed reactants for combination within the medium to the reaction product state. Thus, the ion-containing and conducting medium in the vicinity of each of the electrodes contains ions derived from the fuel and antifuel, respectively. These ions interact, it is believed, to form the products of reaction. Where the fuel is a hydrogen yielding fuel and the antifuel is oxygen yielding, the product of the electrochemical reaction in addition to being an electrical current flowing in the external circuit, is the combustion product, water. As the water builds up within the ion-containing and conducting medium 12 where such medium is aqueous, exhaust means must be provided. Thus, a drain 27 is shown in the figure. The ion-containing and conducting medium need not be a liquid medium, but may be a solid structure such as an ion exchange resin. The only prerequisites of such medium are that it be capable of containing ions and capable of transporting them under the influence of concentration gradients.

In exhausting products of reaction from the cell, the temperature of operation may be sufficient to vaporize such product or products through an exhaust vent, or liquid by-products allowed to drip from a solid ion-exchange membrane or gel, or the system flushed with a gas which is dry relative to the system. In many cases, the magnitude of the load R helps to regulate the temperature and aids in removal of by-products. The higher the current drain, the higher the temperature and the more rapid the removal of volatile exhaust products, such as water.

In operation of a cell such as shown in the figure, the reactants, one of which is a fuel containing hydrogen, and the other of which is an antifuel which is an oxidant for the hydrogen and relatively reducible with respect thereto are fed to opposite sides of the barrier isolating the reactants and means selectively coacting with the barrier for transmitting hydrogen only therethrough are provided so that under the resulting controlled conditions, the reaction between the reactants is permitted to proceed. In the case of a palladium diffuser for hydrogen, a sheet of palladium in combination with the ion-containing and conducting medium serves to maintain the raw reactants apart. The palladium may also serve as an electrode on the fuel side, and a graphite conductor as the electrode on the antifuel side. Oxygen from the antifuel adsorbs on the electrode at the interface, is activated to the chemisorbed state, and under the influence of electrochemical reaction is desorbed and discharged into the aqueous medium as an hydroxyl ion, taking upon an electron from the external circuit in the process of desorption. The presence of an acid or a salt in solution in the ion-containing and conducting medium aids in the process of desorption. Under concentration effects, the hydroxyl ions are moved away from the electrode interface.

Simultaneously on the fuel side of the cell, hydrogen, which may exist in the fuel in the uncombined state, or hydrogen, which has been removed from chemical combination with another element or elements such as carbon, e.g., a hydrocarbon fuel, is permitted to pass through the palladium electrode, becoming adsorbed at the interface thereof to a chemisorbed state and under the influence of electrochemical reaction is desorbed and discharged into the ion-containing and conducting medium yielding up an electron to the external circuit. The giving up of an electron to the external circuit at the fuel electrode, and the taking up of an electron at the antifuel electrode results in the flow of a current through the external circuit capable of doing useful work. R in the figure may be, for example, the field of an electric motor.

As indicated above, palladium, titanium, columbium and iron are selectively porous to hydrogen permitting only this material to pass through, and being impervious to all other materials. Thus, palladium is useful as a means for analyzing pure hydrogen from a mixture of hydrogen and other gaseous materials. Moreover, palladium has the unusual effect of promoting dehydrogenation of materials such as hydrocarbons, this being particularly true in the case of finely divided palladium dispersed on a porous matrix. The fuel and antifuel are fed to the cell from pressurized sources thereby providing a driving force for moving the reactive materials to the corresponding electrode interfaces.

The hydrogen permeable barrier can be used in still a different way, that is simultaneously as a catalyst, an electrode, and a hydrogen selective barrier. Metallic palladium has the property of catalyzing the reaction between a hydrocarbon and water to produce carbon dioxide and hydrogen at slightly elevated temperatures. The optimum temperature will depend upon the particular hydrocarbon or mixture or hydrocarbons which it is desired to use as a fuel.

Thus there has been provided in a reaction apparatus for the interaction of a plurality of reactants, at least one of which includes hydrogen in either chemical or physical admixture, a barrier which isolates the reactive materials, while transmitting hydrogen therethrough for controlled reaction.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A hydrogen-oxidant fuel cell for the direct generation of electricity containing an in situ hydrogen generator, comprising a housing, an anode comprising a non-porous diffusion membrane selectively permeable to hydrogen in close proximity to a hydrogen producing catalytic layer, a cathode, means for supplying a fuel containing hydrogen in chemical combination to said anode and an oxidant to said cathode and an electrolyte between said anode and cathode, said anode analyzing hydrogen from said fuel at said catalytic layer and consuming said hydrogen as it is formed.

2. The fuel cell in accordance with claim 1 wherein the non-porous hydrogen diffusion membrane includes palladium foil.

3. The fuel cell in accordance with claim 1 wherein the non-porous hydrogen diffusion membrane includes iron foil.

4. The fuel cell in accordance with claim 1 wherein the non-porous hydrogen diffusion membrane includes titanium.

5. The fuel cell in accordance with claim 1 wherein the non-porous hydrogen diffusion membrane includes columbium.

References Cited

UNITED STATES PATENTS

| 2,384,463 | 9/1945 | Gunn et al. | 136—86 |
| 2,913,511 | 11/1959 | Grubb | 136—86 |
| 2,925,454 | 2/1960 | Justi et al. | 136—154 |
| 2,925,455 | 2/1960 | Eidensohn et al. | 136—86 |

FOREIGN PATENTS 521,773  5/1940  Great Britain.

OTHER REFERENCES

Transactions of the Electrochemical Society, vol. 68, 1935, pages 449–469.

ALLEN B. CURTIS, *Primary Examiner.*

JOHN R. SPECK, WINSTON A. DOUGLAS,
*Examiners.*

J. MACK, H. FEELEY, *Assistant Examiners.*